United States Patent Office 3,572,374
Patented Mar. 23, 1971

3,572,374
PRESSURE-REGULATING VALVE
Hillebrand Johannes Josephus Kraakman, Emmasingel,
Eindhoven, Netherlands, assignor to U.S. Philips Corporation, New York, N.Y.
Filed Sept. 16, 1969, Ser. No. 858,424
Claims priority, application Netherlands, Sept. 18, 1968,
6813308
Int. Cl. G05d 16/00
U.S. Cl. 137—494        5 Claims

ABSTRACT OF THE DISCLOSURE

The invention relates to a pressure-regulating valve to adjust at a desirable value a pressure of a hydraulic medium to be regulated, said valve comprising a valve body, which is axially movable in a cylinder, the space in the cylinder on the front side of the valve body communicating with the hydraulic medium the pressure of which is to be regulated, and a control force of an adjustable value acting upon the rear side of the valve body.

---

The known pressure regulating valves are generally satisfactory only when no high requirements are imposed upon the accuracy of the pressure to be regulated. Recently, however, there is an increasing demand for extremely accurate operating control apparatus. An example of such apparatus are machine tools, such as lathes, milling machines, and the like with which extremely accurate parts must be manufactured with optically accurate surfaces. An accuracy of size of $0.1\mu$ and an allowable surface roughness smaller than $\tfrac{1}{2}ru$=approximately $0.01\mu$ is imposed upon such machine tools. It will therefore be obvious that the apparatus for controlling such a machine tool must satisfy very great requirements as to accuracy.

It is the object of the invention to provide a pressure-regulating valve of the above-mentioned type in which the accuracy of the pressure to be regulated is very high and in which deviations from the desirable pressure which are caused, for example, in the flow of hydraulic medium, are automatically compensated for by the pressure-regulating valve. In order to achieve this, according to the invention, the outer circumference of the valve body comprises at least one recess which communicates with the space on the front side of the valve body and which opens into a stabilization space incorporated in the cylinder, said stabilization space communicating through an adjustable restriction with an outlet duct for the hydraulic medium and furthermore communicates with an annular chamber, one of the walls of which is formed by an annular surface of the valve body situated at right angles to the centre line of the valve.

The front side of the valve body is loaded by the liquid the pressure of which is to be regulated and on the rear side it is loaded by a control force. When the valve body is in an equilibrium condition, however, the static pressure throughout the front side of the valve will not be equal to the pressure to be regulated. Actually, a quantity of liquid flows through the recesses at a rather large speed, so that at that area the static pressure is considerably lower. However, by causing the medium in the stabilisation chamber to act upon the annular space in the valve, the valve experiences a compensation force which removes the influence of the reduced static pressure in the recess. By means of the adjustable restriction the valve may obtain any desirable characteristic, it being not necessary to adapt the adjustment of the restriction during operation. The pressure to be regulated will hence very accurately have the desirable value.

In a favourable embodiment according to the invention the space in the cylinder on the front side of the valve body communicates, through a restriction, with the space on the rear side of the valve body, the surface area on the front side of the valve body being smaller than the surface area on the rear side thereof, the annular surface which communicates with the outlet port having a size which is equal to the difference between the surface areas on the rear side and the front side of the valve body. The control force in this case is obtained by means of a hydraulic medium. The structural construction of the valve is simple. In a further embodiment according to the invention, the pressure-regulating valve is characterized in that the space on the rear side of the valve body communicates with an annular chamber which is formed in a spring-loaded control valve, said control valve comprising at least two cylindrical valve parts having mutually different outside diameters, said valve parts being axially guidable in a cylinder, one wall of the annular chamber being formed by an annular surface of the valve part having the larger outside diameter, said valve part comprising on its outer circumference at least one recess which communicates with the annular chamber and which opens into an outlet space incorporated in the cylinder, said outlet space communicating with an outlet duct for the hydraulic medium. In this embodiment means are provided to accurately maintain a constant control pressure at the regulating valve.

A very favourable embodiment of the pressure-regulating valve according to the invention is characterized in that the space on the front side of the regulating valve communicates with an annular space which is formed in a spring-loaded control valve, said control valve comprising at least two cylindrical valve parts having mutually different outside diameters, said valve parts being axially guidable in the cylinder. One wall of the annular chamber is formed by an annular surface of the valve part having the larger outside diameter, a further annular chamber is provided in the valve part which communicates, through a duct, with the space behind the regulating valve. The outer circumference of said valve part comprises at least one recess which communicates with the further annular chamber and which opens into an outlet space incorporated in the cylinder. The outlet space communicates with an outlet duct for the hydraulic medium. In this embodiment the control pressure is not kept constant but is adjusted in accordance with the medium pressure to be regulated. This embodiment ensures the greatest accuracy.

A sufficiently good operation of the pressure-regulating valve can also be obtained with extremely simple means. The pressure-regulating valve according to the invention in this case is characterized in that a spring, the resilience of which is adjustable, is operative on the rear side of the valve body, the spring having a spring characteristic which is adapted to the profile of an outlet port which is constituted on the one hand by the orifice of the recess of the valve body and on the other hand by the stabilization space.

In order that the invention may be readily carried into effect, a few examples thereof will now be described in greater detail, by way of example, with reference to the accompanying drawings, in which.

Figure 1:
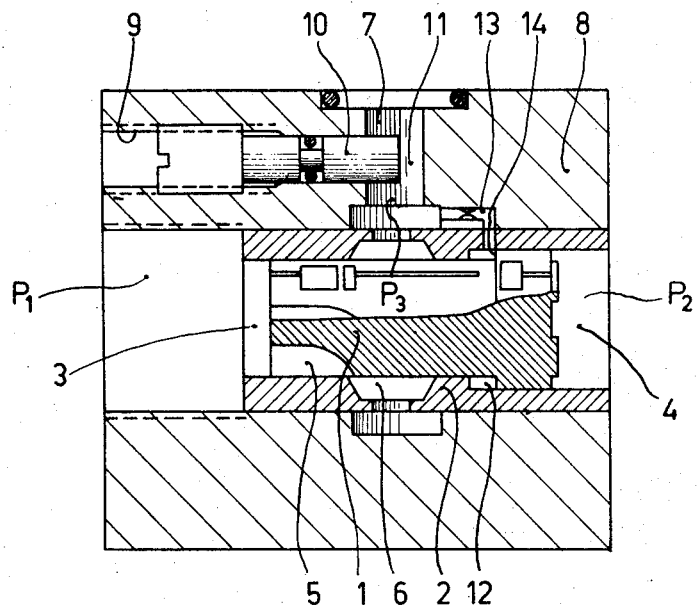
FIG. 1 is a cross-sectional view of an embodiment of a pressure regulating valve according to the invention.

FIG. 1 shows a pressure-regulating valve having a substantially cylindrical valve body 1 which is axially movable in a cylinder 2 and is journalled hydrostatically therein. The space 3 on the front side of the valve body 1 communicates with a duct (not shown) containing hydraulic medium, for example, oil, the pressure of which is to be kept at a constant value. The space 4 on the rear side of the valve body 1 also contains hydraulic medium, in which a control pressure of an adjustable value prevails. In the embodiment shown the diameter of the valve body near the space 4 is larger than the diameter near the space 3. The valve body 1 comprises recesses 5, one of which is visible in FIG. 1. These recesses communicate with the space 3 and open into a stabilisation space 6 which is arranged in the wall of the cylinder 2 and has an annular construction. The recesses and the stabilisation space together constitute outlet ports of adjustable size, through which ports hydraulic medium can be removed from the space 3. From the stabilisation space 6 a bore 7 extends to the outside of the valve housing 8; this bore communicates with an outlet duct (not shown) for the hydraulic medium. In the valve housing 8 a further bore 9 is provided in which a pin 10 is present which is adjustable in the bore by means of a screw-threaded head. The end of the pin 10 thus forms a regulable resistance or restriction 11 for the hydraulic medium flowing through the bore 7. Between the cylinder 2 and the valve body 1 an annular chamber 12 is present which communicates with the stabilisation space 6 through a duct 13. Channel 13 preferably comprises a restriction 30 which acts as a resistance and serves to increase the dynamic stability of the regulating valve. The chamber 12 is formed by a step-like construction of the cylinder 2 and the valve body 1. The annular surface 14 which in area is equal to the difference of the surfaces at the rear and front sides of the valve body 1, constitutes one of the walls of the chamber 12.

The regulating valve shown serves to keep the pressure of a hydraulic medium in a duct communicating with the space 3 constant. The operation of the pressure-regulating valve described may be explained as follows. Let it be assumed that the pressure of the hydraulic medium in the space 3 is equal to $p_1$, and the surface area of the front side of the valve body is equal to $F_1$. The pressure on and the surface area of, respectively, the valve body bounding space 4 is assumed to be equal to $p_2$ and $F_2$, respectively, it being assumed that the pressure $p_2$ is constant. The valve body 1 will be in an equilibrium condition and will hence not move in the cylinder 1 when the forces on the valve body are the same on either side, so if $p_1F_1=p_2F_2$. The outlet ports formed by the recesses 5 and the stabilisation space 6 have an orifice, the size of which depends upon the position of the valve body 1, so that a certain flow of hydraulic medium is conducted away to the bore 7. When the pressure $p_1$ becomes higher, for example, the valve body 1 moves to the right in FIG. 1 over such a distance until again a new equilibrium condition is obtained. The outlet ports have become larger and hence the flow of hydraulic medium has also become larger. For the valve body 1 it holds again in the new equilibrium condition that $p_1F_1=p_2F_2$ and since the areas $F_1$ and $F_2$ have a constant value and the pressure $p_2$ was assumed to be constant the pressure $p_1$ has also automatically obtained again the desirable value.

In the above explanation it is assumed that the static pressure on the whole area $F_1$ on the front side of the valve body is equal to $p_1$. However, hydraulic medium flows through the recesses 5 and the static pressure in these recesses will therefore be lower than $p_1$. Actually, the Bernouilli law:

$p + \frac{1}{2}\rho V^2 =$ constant holds for flowing medium, in which p is the static and $\frac{1}{2}\rho V^2$ is the dynamic pressure, where $\rho$ is the density of the hydraulic medium and $v$ the speed. Since the speed of the medium in the outlet ports can have a large value, the static pressure in the recesses 5 is considerably lower than $p_1$. So the valve body 1 will be moved to the left until a new equilibrium condition adjusts, the forces on either side of the valve body 1 being equal again. However, the outlet ports have then become smaller so that the pressure of the hydraulic medium to be regulated will be higher than the desirable value $p_1$. This is not admissible since the regulating valve is just meant for apparatus having an extremely high precision. In order to obtain a desirable very great accuracy, according to the invention, means are present to compensate for the influence of the decrease of the static pressure in the recesses. For that purpose the pin 10 is present which restricts the passage 7 to the outlet duct and hence forms an adjustable resistance 1 for the hydraulic medium to be conducted away. As a result of this resistance a pressure, for example, $p_3$, is generated in the stabilisation space 6 which is higher than the pressure in the bore 7 beyond the restriction 11. This pressure $p_3$ is used to compensate for the decrease of the static pressure in the recesses 5. For that purpose, the stabilisation space 6 communicates with the chamber 12. The hydraulic medium in which the pressure $p_3$ prevails acts upon the annular surface 14 of the valve body, and hence causes an extra force on the valve body which is directed to the right. This compensation force can have such a value for any medium flow passing the regulating valve that it exactly balances the influence of the dynamic pressure in the recesses 5. For that purpose, the restriction 11 in the bore 7 must have one particular size which is dependent only upon the passage of the recesses 5 and of the areas $F_1$ and $F_2$ of the valve body 1. Since these are all constant, the correct compensation will be obtained with any supply. The pressure to be adjusted can be regulated extremely accurately with the pressure-regulating valve thus obtained.

Figure 2:
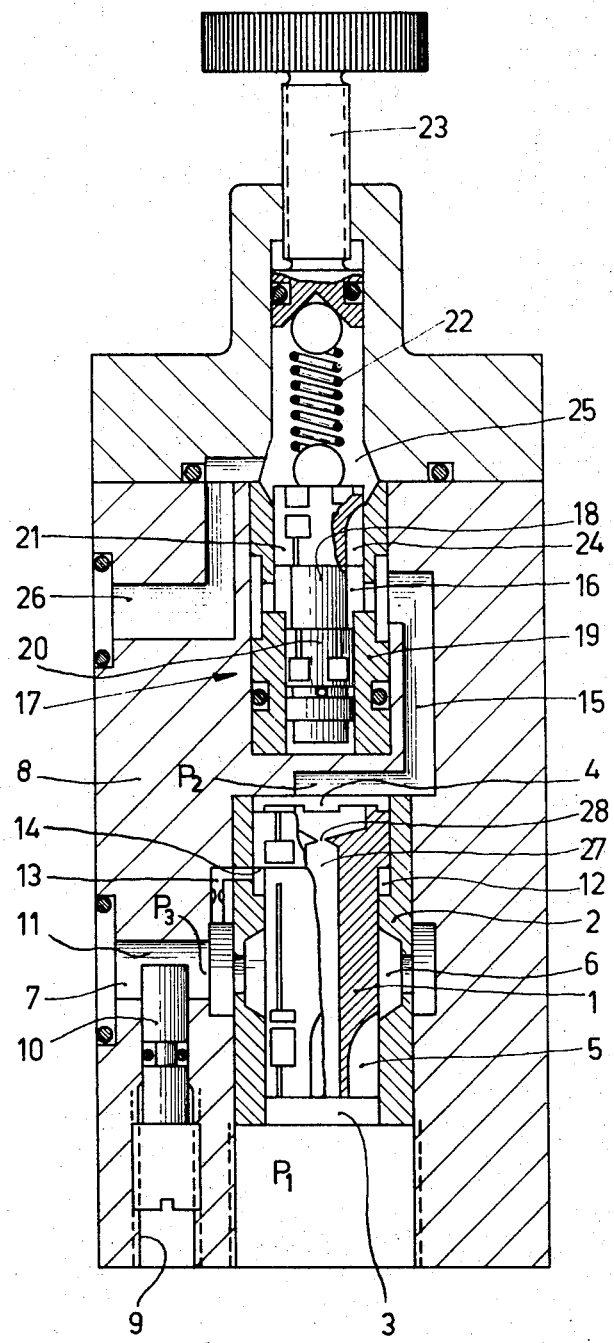
FIG. 2 shows a pressure-regulating valve in which means are present for keeping the control pressure constant.

FIG. 2 shows an embodiment of the pressure regulating valve shown in FIG. 1, in which a favourable solution is shown to keep the pressure $p_2$ which acts upon the valve body constant. The operation of the regulating valve shown is in principle as that of the valve described with reference to FIG. 1. Therefore, the same reference numerals are used. In the valve body 1 a bore 27 is present which comprises a restriction 28. Through this restriction 28 a small quality of medium flows from the front side to the rear side of the valve body, and from there flows through a duct 15 to a chamber 16 in a control valve 17. The valve body 18 of the control valve 17 is movable in a cylinder 19 and comprises valve parts 20 and 21 of different diameters. The hydraulic medium exerts a force on the control valve which is equal to the pressure $p_2$ times the difference in surface area of the two valve parts 20 and 21. The valve body 18 is spring-loaded by a spring 22. which is adjustable by means of a screw-threaded pin 23. In valve part 21 of the control valve recesses 24 are provided which communicate with chamber 16 and open into a space 25, from where the hydraulic medium is conducted away through the duct 26. Adjustable outlet ports are again formed by the recesses 24 and the space 25.

So a force acts upon the valve body 18 of the control valve in one direction, which force is caused by the spring 22, and in the other direction a force which is equal to $p_2$ times the difference of the areas of the valve parts 20 and 21, the valve being in equilibrium and being hence not moved axially. When $p_2$ becomes higher, the valve body 18 will move upwards so that the outlet ports become larger. The liquid removal through the outlet ports therefore becomes larger and the valve body 18 will be adjusted so that $p_2$ again has the desirable value to be kept constant. With the control valve the flow in the outlet ports will hardly be of influence on the static pressure in the recesses 24; the quantity of medium supplied through the restriction 28, actually is small so that the flow rate in the recesses 24 will also be low. The valve shown in FIG. 2 is a precontrolled valve in which the flow influences in the regulating valve are compensated and in which the control valve accurately keeps a control pressure $p_2$ constant. The ball valves usually applied as control valves, in most cases show a strong extent of instability and are therefore not suitable for keeping a control pressure accurately constant.

The movable valve parts in the control valve are also journalled hydrostatically, so that the axial movement occurs substantially without friction. Furthermore measures are taken to damp the movement of the control valve so that no dynamic instability occurs.

Figure 3:
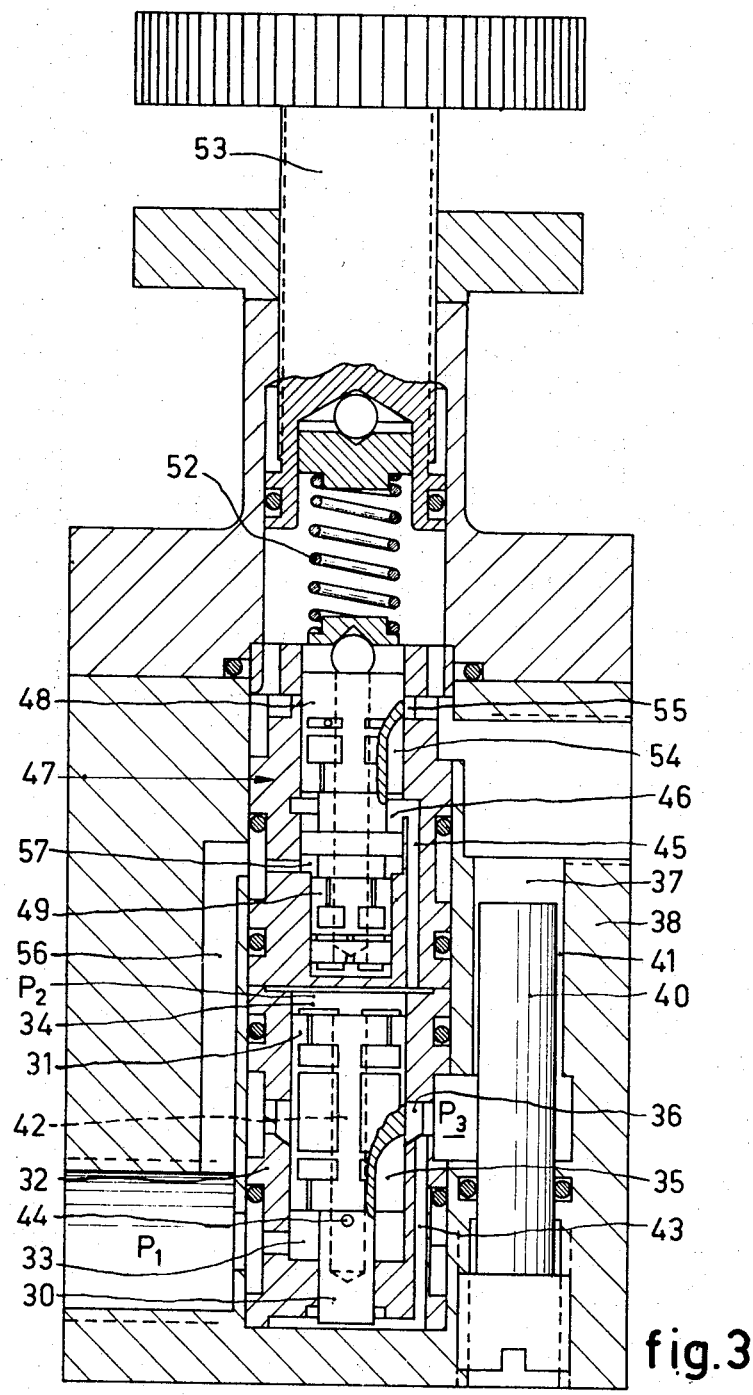
FIG. 3 shows a pressure-regulating valve in which the control pressure is adjusted in accordance with the medium pressure to be regulated.

FIG. 3 shows a further embodiment of the pressure-regulating valve according to the invention, in which the control pressure $p_2$ is not kept constant but is adjusted at a particular value dependent upon the pressure $p_1$ to be regulated. The regulating valve is again of the same type as the valve described with reference to FIG. 1, but the structural construction is slightly different. A valve body 31 is axially movable in a cylinder 32. On the front side of the valve body 31 an elongate cylindrical part 30 is arranged. The valve body 31 comprises recesses 35 which, together with the stabilisation space 36, constitutes outlet ports for the hydraulic medium to be regulated, which medium is present with a pressure $p_1$ on the front side of the valve body in the space 33. A bore in which a pin 40 is adjustable is provided in the valve housing 38. Thus a restriction or resistance 41 of adjustable size is formed in the space 37 which extends from the stabilisation chamber 36 to an outlet duct. The stabilisation chamber 36 in which a pressure $p_3$ prevails as a result of the restriction 41, communicates through duct 43 with the front side of the part 30 of the valve body 31. A bore 42 is present in the valve body 31, a narrow passage 44 forms a restriction for the medium which can flow from the front side to the rear side of the valve body 31.

The hydraulic medium on the rear side of the valve body 31 flows from the space 34 through a duct 45 to an annular chamber 46 in a control valve 47; it exerts no resulting axial force on the valve body which consists of two valve parts 48 and 49. In valve part 48 recesses 54 are present which extend from the chamber 46 to an outlet space 55. The recesses 54 and the outlet space 55 again form outlet ports for the hydraulic medium of pressure $p_2$. The outlet space 55 communicates with the bore 37 and hence also with an outlet duct for the hydraulic medium. The valve body 48 is loaded by a spring 52, the resilience of which is adjustable by means of a pin 53. The valve body 48, 49 is journalled hydrostatically to avoid frictional resistance and comprises means for damping the movement of the valve so that a good dynamic stability is obtained.

The fundamental difference from the construction shown in FIG. 2 is that not the pressure $p_2$ which acts on the valve body 31 on the rear side is kept constant by means of the control valve, but that the pressure $p_2$ obtains a value by means of the control valve 47 which is adapted to the prevailing value of the pressure $p_1$ to be regulated. Medium in which the pressure $p_1$ prevails is actually conducted through a duct 56 to a chamber 57 in the control valve, and generates a force in the valve body which is equal to $p_1$ times the difference in the areas of the two valve parts 48 and 49. When the control valve is in equilibrium, said force is equal to the force in the spring 52.

So in this construction the pressure $p_2$ is not used to obtain the equilibrium of forces in the control valve 47, and at the same time to regulate $p_2$ at a constant value. In this case it is the pressure $p_1$ itself to be regulated which ensures an equilibrium condition in the control valve, with the spring. The position of the valve body 48, 49 causes an outlet aperture of a particular size near the outlet port 55 with which hence a particularly value of the pressure $p_2$ is associated. The valve described in FIG. 3 operates more accurately than the valve described with reference to FIG. 2. In the construction shown in FIG. 2, the compensation of the deviation of the static pressure in the regulating valve will in practice not operate for 100% accurately, for example, in connection with very small deviations in size in the components. So the prevailing pressure $p_1$ may have a small deviation in value from the desirable pressure $p_1$ and the pressure $p_2$ which has a constant value cannot alter this. However, it is by no means necessary to create a constant pressure $p_1$ for controlling the regulating valve. In the construction shown in FIG. 3 the control valve 47 is not adjusted by the control pressure $p_2$ but by the regulating pressure $p_1$. If in this case also the compensation of the static pressure in the regulating valve should not be complete but, for example, $p_1$ becomes somewhat too high, this pressure $p_1$ also acts upon the control valve namely in the chamber 57. So the control valve moves slightly upwards and $p_2$ becomes lower since the outlet port 54, 55 becomes somewhat larger. The regulating valve consequently moves slightly upwards and assumes an equilibrium condition in which $p_1$ does not have the desirable value. By causing the liquid pressure to act upon the control valve, a deviation from the compensation force on the regulating valve is hence balanced, so that the valve shown in FIG. 3 ensures an extremely great accuracy of the pressure $p_1$ to be regulated. The spring 53 will be of influence on the position of the control valve and hence on the value of the control pressure $p_2$. The displacement of the control valve, however, is very small so that the spring force will hence be substantially constant. By choosing a spring having a spring characteristic which is favourable for the valve, it can furthermore be avoided that the spring causes a wrong pressure.

It is alternatively possible to control the regulating valve shown in FIG. 1 directly by means of a spring having an adjustable resilience. In this case no hydraulic control pressure $p_2$ acts upon the rear side of the valve body 1, as is shown in FIG. 1, but on this surface the said spring is directly operative. Although such a regulating valve may be slightly more inaccurate than, for example, the regulating valve shown in FIG. 2, a good compensation for the influence of the decrease of the static pressure in the recesses 5 can nevertheless be obtained. For this purpose a spring is used the spring characteristic of which is adapted to the profile of the outlet ports which are constituted by the recesses 5 and the stabilisation space 6.

What is claimed is:

1. A pressure-regulating valve for adjusting at a desirable value a pressure of a hydraulic medium to be regulated, said valve comprising a valve body which is axially movable in a cylinder, the space in the cylinder on the front side of the valve body communicating with the liquid the pressure of which is to be regulated, and a control force of an adjustable value acting upon the rear side of the valve body, the outer circumference of the valve body comprising at least one recess which communicates with the space on the front side of the valve body and which opens into a stabilization space incorporated in the cylinder, said stabilization space communicating through an adjustable restriction with an outlet duct for the hydraulic medium and further communicates with an annular chamber one of the walls of which is constituted by an annular surface of the valve body.

2. A pressure-regulating valve as claimed in claim 1, in which the space in the cylinder on the front side of the valve body communicates through a restriction with the space on the rear side of the valve body, the surface area on the front side of the valve body being smaller than the surface area on the rear side thereof, the annular surface bounding the annular chamber which communicates with the outlet port having a size which is equal to the difference between the areas on the rear side and the front side of the valve body.

3. A pressure-regulating valve as claimed in claim 2, wherein the space on the rear side of the valve body communicates with an annular chamber which is formed in a spring-loaded control valve which comprises at least two cylindrical valve parts having mutually different outside diameters, said valve parts being axially guidable in a cylinder, one wall of the annular chamber being formed by an annular surface of the valve part having the larger outside diameter, said valve part comprising on its outer circumference at least one recess which communicates with the annular chamber and which opens into an outlet space incorporated in the cylinder and communicating with an outlet duct for the hydraulic medium.

4. A pressure-regulating valve as claimed in claim 2, wherein in that the space on the front side of the regulating valve communicates with an annular chamber which is formed in a spring-loaded control valve which comprises at least two cylindrical valve parts having mutually different outside diameters, said valve parts being axially guidable in a cylinder, one wall of the annular chamber being formed by an annular surface of the valve part having the larger outside diameter, a further annular chamber being present in said valve part and communicating through a duct with the space behind the regulating valve, the outer circumference of said valve part comprising at least one recess which communicates with the further annular chamber and which opens into an outlet space incorporated in the cylinder, said outlet space communicating with an outlet duct for the hydraulic medium.

5. A pressure-regulating valve as claimed in claim 1, wherein in that a spring of which the resilience is adjustable is operative on the rear side of the valve body, the spring having a characteristic which is adapted to the profile of an outlet port, said port being formed on the one hand by the orifice of the recess of the valve body and on the other hand by the stabilization space.

References Cited

UNITED STATES PATENTS

| | | | |
|---|---|---|---|
| 2,851,564 | 9/1958 | Zimmerman | 137—491X |
| 2,853,096 | 9/1958 | Lee | 137—491 |
| 3,150,685 | 9/1964 | Lohbaver et al. | 137—491X |
| 3,208,473 | 9/1965 | Budzich et al. | 137—491X |
| 3,402,734 | 9/1968 | Robbins Jr. | 137—491 |
| 3,421,541 | 1/1969 | Webb | 137—491 |

M. CARY NELSON, Primary Examiner

R. J. MILLER, Assistant Examiner